INVENTOR
CLAUS KLEESATTEL

Feb. 7, 1967 C. KLEESATTEL 3,302,454
RESONANT SENSING DEVICES
Filed Oct. 8, 1964 2 Sheets-Sheet 2

INVENTOR
CLAUS KLEESATTEL
BY
ATTORNEY

United States Patent Office 3,302,454
Patented Feb. 7, 1967

3,302,454
RESONANT SENSING DEVICES
Claus Kleesattel, 9841 64th Road,
Forest Hills, N.Y. 11375
Filed Oct. 8, 1964, Ser. No. 402,600
16 Claims. (Cl. 73—67.1)

This invention relates generally to resonant sensing devices which can be used to test or determine physical properties or characteristics of test pieces. This application is a continuation-in-part of my copending application for United States Letters Patent, Serial No. 154,235, filed November 22, 1961 and which issued on October 20, 1964, as United States Letters Patent No. 3,153,338.

As indicated in the above identified Letters Patent, when a mechanical resonating member is held in steady contact with a test piece at a contact surface having progressively increasing cross-sectional areas, as would be provided by a rounded, conical or pyramidal contact tip on the resonating member or a curved surface on the test piece, the resonance frequency of the resonating member is dependent upon the degree of coupling between the resonating member and the test piece, and hence upon the surface compliance and hardness of the test piece and the magnitude of the force acting to hold the resonating member in steady contact with the test piece.

In devices employing the foregoing principle for testing of materials, a mechanical resonating member having a rounded or other contact tip with progressively increasing cross-sectional areas is provided with electrically energized means for effecting vibration of the mechanical resonating member at resonance frequencies of the latter. The resonating member has a loop of vibration occurring at the contact tip so that, when the contact tip is urged into steady contact with a test piece by a suitably applied constant or known force, the change in the resonance frequency of the resonating member between its free condition, or its condition of contact with a standard test piece, and its condition of contact with the test piece being examined, is an indication of the physical properties or characteristics at the surface of the test piece. Alternatively, the mechanical resonating member may have its tip held in steady contact with a test piece by means of a variable force, and the change in the force required to achieve resonance of the resonating member at the same frequency when held in contact with a standard test piece and with the test piece to be examined is measured as an indication of the variation between the physical properties or characteristics of the test piece and those of the standard piece.

When the mechanical resonating member is in the form of an elongated metal rod in which longitudinally directed compressional waves are generated at a resonance frequency of the rod and the latter is dimensioned so as to have a length equal to one, or any other whole multiple, of the half-wavelength of the compressional waves, a rounded or other contact tip at one end of the rod undergoes vibration in the direction of the longitudinal axis of the latter. If the longitudinally vibrated rod is disposed with its axis normal or perpendicular to the surface of the test piece at the region of contact with the latter by the contact tip, then the shift of resonance frequency depends primarily on the normal surface compliance which, in turn, is a function of the static contact force holding the contact tip against the test piece and on the elasticity modulus E. If the static force holding the contact tip in steady contact with the surface of the test piece is sufficient to cause plastic deformation of the latter, the shift of resonance frequency is further influenced by the hardness of the tested surface.

It is an object of the present invention to provide resonant sensing devices of the described character wherein the vibration or excitation at the contact tip of the mechanical resonating member is in a plane parallel or tangential to the surface of the test piece contacted by the tip so that the relative shift of the resonance frequency depends on the surface shear compliance which in turn depends on the static force holding the tip in steady contact with the test piece and on the shear modulus G. In this case, if the static force is sufficient to cause plastic deformation, the relative shift in the resonance frequency is also influenced by the hardness of the contacted surface of the test piece. The use of a resonant sensing device employing vibrations at the contact tip in a plane parallel or tangential to the contacted surface of the test piece is particularly advantageous when testing the hardness of thin structures, for example, the metal skins of aircraft components, which, by reason of their shape and size, cannot be adequately backed up or supported during the testing procedure.

Where the mechanical resonating member is in the form of an elongated rod which is longitudinally vibrated, a contact tip may be mounted at least at one side of an end of the rod and pressed against the surface of the test piece with the axis of the rod lying in a plane parallel or tangential to the surface of the test piece so that the vibrations or excitation of the contact tip will also be parallel or tangential to the surface being tested. Such an arrangement is particularly suited for differential or comparative testing, in which case, opposed contact tips are provided at the end of the sensor rod constituting the mechanical resonating member and respectively engage a standard piece and a test piece. The described arrangement for obtaining tangential vibration or excitation of the contact tip relative to the surface being tested with a longitudinally vibrated sensor rod is also advantageous for testing the shear compliance and hardness at the inner surface of a tube or pipe. However, in most other situations where tangential excitation of the contact tip is desired, it is advantageous to effect such excitation or vibration of the contact tip by either flexural or torsional excitation of the mechanical resonating member.

Another object is to provide resonant sensing devices which can be excited to alternately provide vibration of the contact tip either normal or tangential to the engaged surface of the test piece.

The above, and other objects, features and advantages of the invention, will be apparent in the following detailed description of ilustrative embodiments thereof which is to be read in connection with the accompanying drawings forming a part hereof and wherein.

Figure 8:
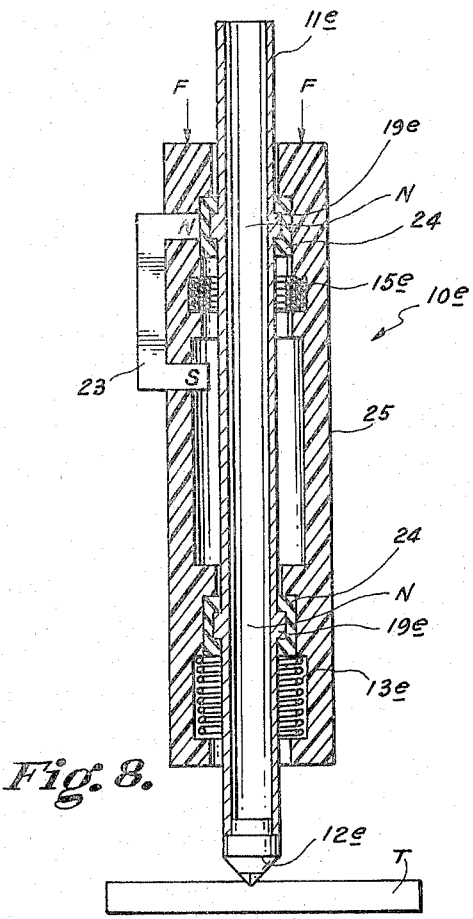
Figure 9:
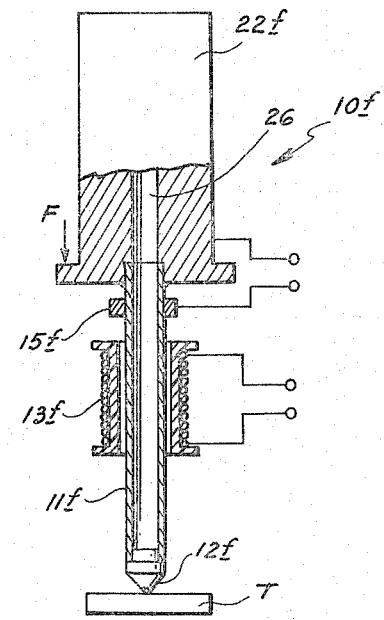

FIG. 8 is an axial sectional view of a sensing device embodying this invention in which the sensor or mechanical resonating member is capable of being excited in either the longitudinal or torsional modes; and FIG. 9 is a schematic axial sectional view of another device capable of excitation in either the longitudinal or torsional modes, and which has a stepped sensor for increased sensitivity or resolving power.

Figure 1:
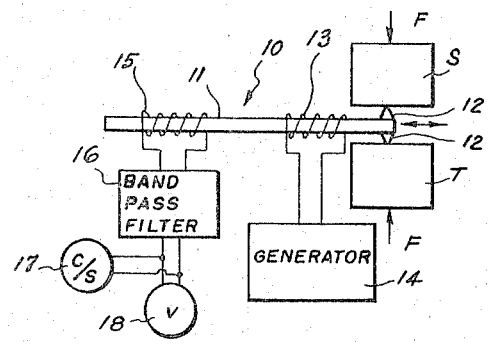
FIG. 1 is a schematic view illustrating a sensing device embodying the present invention for use in comparing the shear compliance at the surface of a test piece with that of a standard piece.

Referring to the drawings in detail, and initially to FIG. 1 thereof, it will be seen that a sensing device embodying the present invention and there generally identified by the reference numeral 10 comprises a mechanical resonating member in the form of an elongated rod 11 having contact tips 12 extending from the opposite sides of one end of the rod and being rounded or otherwise formed, for example, with a conical or pyramidal configuration, to each define a contact surface having progressively increasing cross-sectional areas. The tips 12 are held in steady contact with a test piece T of unknown shear compliance and a standard piece S which are suitably pressed against the respective contact tips at the opposite sides of the rod by a constant static force F. Electrically energized means are provided for effecting longitudinal vibration of the rod 11 at resonance frequencies of the latter. In the device 10, such vibration of the rod 11 is effected by forming the latter of a magnetostrictive material, for example, permanickel, nickel, permendur or other metals which have resonably small band widths (high mechanical Q), so that the rod 11 will vibrate when subjected to the influence of an alternating electromagnetic field established by the supplying of a suitable alternating current to an energizing coil 13 from a generator of electrical oscillations 14. Polarization of rod 11 may be effected by supplying a biassed alternating current from the generator 14 to coil 13, and the rod 11 may also be vibrated without polarization thereof, if the exciting frequency is one-half the resonance frequency of the rod.

The magnetostrictive rod 11 may be dimensioned to have loops of its longitudinal vibrational movement occurring at its opposite ends, and this condition may be satisfied by providing the rod 11 with a length which is a whole multiple of one-half the wavelength of the compressional waves generated in the material of the magnetostrictive rod at the frequency of the alternating current supplied to the energizing coil.

A pickup coil 15 extends around the magnetostrictive rod 11 and has an alternating voltage induced therein by reason of the vibration of the rod. Such voltage is induced at the frequency of vibration of the rod and has a magnitude corresponding to the amplitude of the vibrations. The pickup coil 15 is connected through a band pass filter 16 to a frequency meter 17 and a vacuum tube voltmeter 18.

It will be apparent that, upon excitation of the rod 11, the longitudinally directed vibrations at the end of the rod carrying the contact tips 12 effect vibrations of the latter in directions parallel or tangential to the contacted surfaces of the standard piece S and the test piece T. If the test piece T and standard piece S have different shear compliances, the resulting alternating torque sets up a bending wave in the magnetostrictive rod 11, and this bending wave produces a signal in the pickup coil 15 at a frequency twice that of the resonance frequency at which the biassed alternating current is fed to the exciting coil 13. The band pass filter 16 is selected to pass only the second harmonic or first overtone of the resonance frequency which is measured or read on the frequency meter 17 when the voltmeter 18 indicates a voltage peak. The measured resonance frequency read on the meter 17 is an indication of the difference between the shear compliances of the standard piece S and test piece T.

Figure 2:
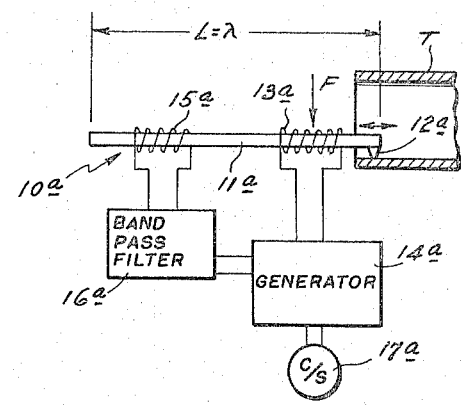
FIG. 2 is a schematic view of a device similar to that of FIG. 1, but shown employed for measuring the shear compliance and hardness at the surface of a test piece in the form of a tube or pipe.
Figure 2A:
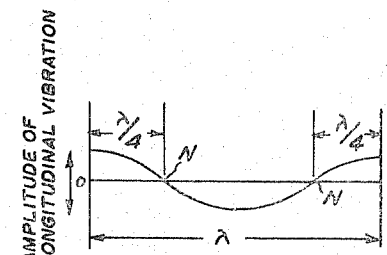
FIG. 2a is a graphic representation showing the amplitude distribution along the mechanical resonating member of the device of FIG. 2 under the free condition.

As shown on FIG. 2, a sensing device 10a which is a modification of the device 10 may be conveniently employed for determining the shear compliance and hardness at the inner surface of a test piece T which is in the form of a tube, pipe or other article having a restricted space across its interior. The device 10a has a magnetostrictive rod 11a with a single contact tip 12a at one end for vibration in the direction parallel to the axis of the rod when the latter is excited by the supplying of a biassed alternating current to a coil 13a from a tunable oscillation generator 14a. The generator 14a may be of a conventional feed-back so that the output frequency of the generator is automatically varied to correspond to the resonance frequency of the rod 11a in accordance with the feedback voltage supplied to the generator through the band pass filter 16a from the pickup coil 15a. The band pass filter 16a is selected to pass feed-back only in the desired range of frequencies. With the arrangement of FIG. 2, the rod 11a is always vibrated at a resonance frequency thereof and the value of such resonance frequency, at any time, can be read on the frequency meter 17a.

Where the rod 11a has a length L equal to the wavelength of the compressional waves generated in the material of the rod at the resonance frequency of the latter in the free condition, loops of longitudinal motion occur at the ends of the rod and nodes N appear at points which are spaced one-quarter wavelength from the ends of the rod, as shown on FIG. 2a. The rod 11a can be supported at such nodes N and the force F directed at right angles to the axis of the rod for urging the tip 12a into steady contact with the inner surface of the tube T can be suitably applied at the node which is closest to the end carrying the contact tip.

In using the device 10a, it is only necessary to note the difference between the resonance frequencies indicated by the meter 17a under the condition of free vibration and when the contact tip of the rod is held in steady contact with the test piece. Since the vibrations at the contact tip 12a are directed parallel to the contacted inner surface of tube T, the shift in resonance frequency is a function of the shear compliance at such surface and, if the force F holding the tip in steady contact with the surface of the tube is sufficient to cause plastic deformation of the surface, the frequency shift is also a function of the hardness at the surface of the tube.

Figures 3, 3A:
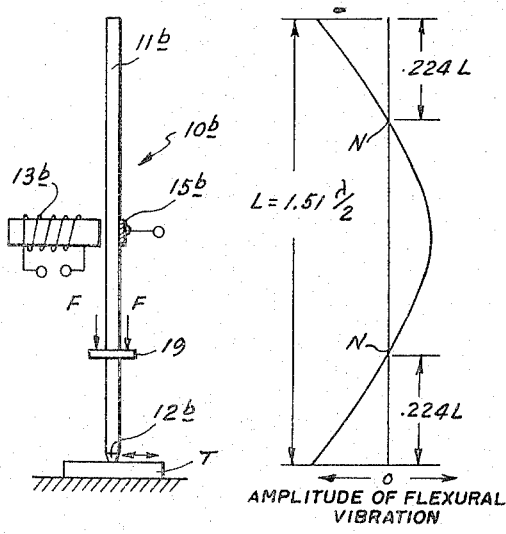
FIG. 3 is a schematic view illustrating a sensing device embodying the present invention and employing flexural vibration or excitation of the mechanical resonating member for determining the shear compliance and hardness of a test piece.
FIG. 3a is a graphic representation of the distribution of the amplitude of flexural vibration along the mechanical resonating member of FIG. 3 during resonant vibration thereof under the free condition.

In the devices 10 and 10a, the longitudinally vibrated resonating members 11 and 11a must be held parallel or tangential to the surface of the test piece which is to be engaged by the contact tip or tips in order to provide vibrations at the tip or tips in directions parallel or tangential to the engaged surface and this restricts or renders inconvenient use of such devices, particularly when the test piece has a large flat surface. Accordingly, devices embodying this invention may also be provided with mechanical resonating members which are intended to be disposed normal or perpendicular to the surface of the test piece and which are excited to cause vibration of a contact tip in directions parallel or tangential to the engaged surface of the test piece. An example of such a device 10b is shown on FIG. 3 to include an elongated, flexurally excited rod 11b having a rounded, conical or pyramidal contact tip 12b at one end and being held with its longitudinal axis extending perpendicular to the surface of a test piece T against which the contact tip is held in steady contact by means of a suitable static force F applied to the rod, for example, at a flange 19 extending from the rod at a node N of its flexural vibration. As indicated on FIG. 3a, the rod 11b may advantageously have a length L equal to 1.51 times the half-wavelength of the flexural waves generated in the material of rod 11b at the resonance frequency of the latter in the free condition. When the rod 11b is thus dimensioned, two nodes N of the flexural vibration appear at points spaced .224L from the ends of the rod, while the maximum flexural vibration directed substantially laterally with respect to the axis of the rod occurs at the ends of the latter.

In order to effect flexural vibration of the rod 11b, the device 10b may further include an energizing coil 13b wound on a ferrite core which may be permanently magnetized and extends laterally with respect to the rod 11b substantially at the middle of the latter. A suitable pickup crystal 15b is cemented or otherwise suitably secured to the rod 11b to provide a signal or voltage at the frequency of the vibration of the rod and with a magnitude which is dependent upon the amplitude of the flexural vibration of the rod. The energizing or exciting coil 13b may be supplied with alternating current at resonance frequencies of the rod in flexural vibration, for example, from a suitable feed-back generator under the control of the signal from the pickup crystal 15b in a manner similar to that illustrated on FIG. 2, so that the current supply to the energizing coil is always at the resonance frequency of the rod 11b.

In using the device 10b, it is only necessary to note the difference between the resonance frequencies of the flexurally vibrated rod 11b under the condition of free vibration and when the rod is held in steady contact with the test piece. Although the rod 11b is held with its axis normal to the surface of the test piece T, the contact tip 12b is vibrated in the direction parallel or tangential to the surface of the test piece so that the shift in resonance frequencies is a function of the shear compliance at the surface and, in the event that the static force F is sufficient to cause plastic deformation, also a function of the hardness of the surface.

Figures 4, 4A:
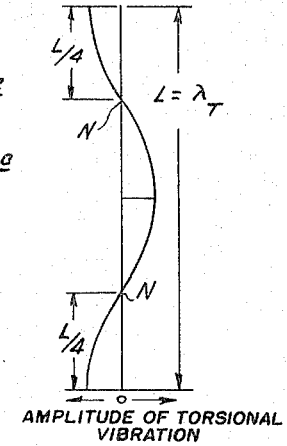
FIG. 4 is a schematic view illustrating a sensing device embodying this invention and employing torsional excitation or vibration of the mechanical resonating member for use in determining the shear compliance and hardness of a test piece.
FIG. 4a is a graphic representation of the distribution of the amplitude of torsional vibration along the mechanical resonating member of FIG. 4 during vibration thereof under the free condition.
Figure 5:
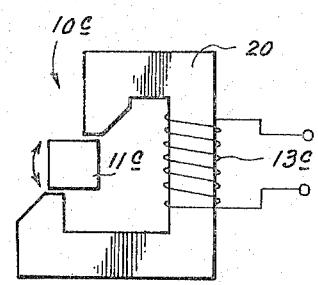
FIG. 5 is an enlarged top plan view of the device shown on FIG. 4.

Referring to FIGS. 4 and 5, it will be seen that a resonant sensing device 10c embodying this invention may include a mechanical resonating member or sensor 11c in the form of a torsionally excited rod held with its axis normal to the surface of the test piece T and having a contact tip 12c at one end pressed against the test piece to produce a twisting oscillation in the surface of the test piece. In this case, the measured frequency shift between the resonance frequency of rod 11c in torsional vibration under the free condition and the resonance frequency thereof when the tip 12c is held in steady contact with the test piece again is a function of the static force pressing the tip against the test piece and of the shear modulus G. If the static force is large enough to produce plastic deformation of the surface of the test piece by the contact tip, then the frequency shift is also dependent upon the surface hardness of the test piece. Obviously, when the torsional torque is large enough, or when the static force holding the tip in contact with the surface is small enough, slipping of the contact tip relative to the surface may occur. In order to avoid this relative slipping, the contact tip 12c may be given a pyramidal configuration, similar to that of a Vickers indentor. On the other hand, if one is interested in the frictional properties of the surface of the test piece, the tip 12c may be given a conical configuration and measurement made of the torque at which slippage occurs, with the onset of the slipping, and hence the value of the torque, being easily detected by the usual electronic equipment employed for energizing and controlling the mechanical resonating member or sensor 11c.

The torsionally excited sensor or rod 11c may have a length L equal to the wavelength of the torsional waves generated in the rod at the resonance frequency of the latter in which case, as shown on FIG. 4a, loops of the torsional movement or oscillations may occur at the ends of the rod and at the mid-point of the latter, while nodes N appear at two points spaced from the opposite ends of the rod by distances equal to a quarter-wavelength. As shown on FIG. 5, the rod 11c may have a square cross-section and be energized by alternating current supplied at resonance frequencies to an exciter coil 13c which is wound on a ferrite yoke 20. The yoke 20 is of generally C-shaped configuration terminating in arms which embrace the end portion of the rod remote from contact tip 12c at diagonally opposed locations of the square rod cross-section. The alternating current in the exciter coil 13c produces an alternating torque so that the rod is mechanically excited in a torsional mode. The pickup system of the device 10c includes a generally C-shaped ferrite yoke 21 (FIG. 4) having a shape and arrangement similar to that of the yoke 20 and being disposed adjacent the middle of rod 11c. The yoke 21 is either permanently magnetized, or a D.C. bias current is fed to the pickup coil 15c wound on the yoke 21. The variable reluctance effect of the torsionally oscillating rod embraced by the yoke 21 causes a voltage to be induced in coil 15c at the frequency of the torsional vibration of the rod and at a magnitude which is dependent upon the amplitude of the torsional vibrations. The signal from pickup coil 15c can be employed to control an oscillation generator (not shown) of the conventional feed-back type for supplying the alternating exciting current to the coil 13c so that such exciting current is always at the resonance frequency of the torsionally vibrated rod. The force F for holding the contact tip 12c in steady contact with the test piece T may be applied in the direction of the axis of rod 11c at a flange 19c extending from the rod at a node of the torsional vibration of the latter.

In using the device 10c, it is only necessary to note the difference between the resonance frequencies indicated by a suitable meter under the condition of free vibration in the torsional mode and when the rod is held in steady contact with the test piece.

Figure 6:
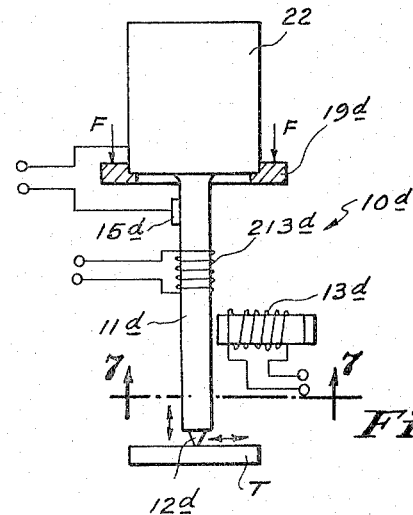
FIG. 6 is a schematic view illustrating a sensing device embodying this invention and having a mechanical resonating member which may be excited for either longitudinal or flexural vibration.
Figure 7:
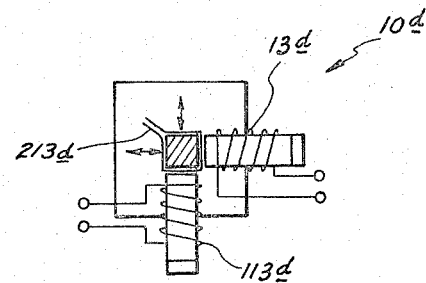
FIG. 7 is a sectional view taken along the line 7—7 on FIG. 6.

Referring now to FIGS. 6 and 7, it will be seen that a resonant sensing device 10d as there disclosed may include a quarter-wavelength sensor rod 11d extending from a quasi-infinite mass 22, that is, a mass or body having a mechanical impedance that is substantially, preferably at least ten times, greater than the mechanical impedance of the rod 11d. The rod 11d and body 22 are supported, as a unit, at a flange 19d extending from the end of mass 22 joined to the rod, and the latter is flexurally excited by alternating current supplied at resonance frequencies of the rod to a coil 13d wound on a permanently magnetized ferrite core extending laterally with respect to the rod. The alternating exciting current may be supplied to coil 13d from a feed-back oscillation generator (not shown) under the control of signals from a pickup crystal 15d mounted on the rod 11d so that the supply of alternating current is always at the resonance frequency of the sensor rod.

In my copending application for U.S. Letters Patent, Serial No. 339,176, filed January 21, 1964, I have disclosed the advantages, with respect to increased resolution and sensitivity, that result when a resonant sensing device is provided with a quarter-wavelength sensor rod which is longitudinally vibrated and has a quasi-infinite mass attached to the end of the rod remote from the contact tip. In the foregoing case, it was shown that the resonance frequency undergoes a shift or increase of 100% when comparing the resonance frequency for the free condition with the resonance frequency for the clamped condition. In the case of a flexural resonating member, as in FIG. 6, the free end of the rod 11d has two characteristic motions, that is, the transverse or lateral displacement and an angular velocity. If a comparison is made of the resonance frequencies of the quarter-wavelength flexural resonating member of FIG. 6 for the free condition of the end carrying the contact tip and for the "pinned" condition of the tip, that is, having its lateral displacement restricted to zero while the angular motion is unrestricted, it is found that the frequency for the pinned condition is 4.42 times the frequency for the free condition. Thus, there is a frequency shift of 342%. From the foregoing, it will be appreciated that the flexural resonating member of FIG. 6 is more sensitive and provides greater resolution than quarter-wavelength resonating members which are longitudinally vibrated as in the previously mentioned application Serial No. 339,176.

If it is desired to investigate the anisotropy of the surface of the test piece, the device $10d$ may be provided with an additional flexural exciting coil $113d$ (FIG. 7) wound on a magnetized ferrite core which extends at right angles to the core of the coil $13d$. The coils $13d$ and $113d$ are energized alternately from a suitable generator. According to the degree of anisotropy, one will measure one frequency shift during energization of the coil $13d$ and another frequency shift during energization of the other flexural exciting coil $113d$.

The quarter-wavelength rod $11d$ may be further excited axially for longitudinal vibration by a coil $213d$ $213d$ extending about the rod and being alternatively energized to permit measurement of the shift of resonance frequencies for longitudinal vibration, that is, as an indication of the normal compliance of the contacted surface of the test piece. Thus, the arrangement shown on FIGS. 6 and 7 permits the alternate operation of the device $10d$ either with torsional vibration of its sensor rod $11d$ or with longitudinal vibration of the latter.

Referring now to FIG. 8, it will be seen that the resonant sensing device $10e$, as there illustrated, includes a tubular sensor rod $11e$ which carries a permanent magnetization in the circumferential direction, for example, as disclosed at page 76 of "Physical Acoustics," by W. P. Mason, Van Nostrand, 1958. Extending around the tubular rod $11e$ is an energizing coil $13e$ which is connected to a suitable tunable oscillation generator (not shown). Current fed to the energizing coil $13e$ causes an axial field to be generated which combines with the permanent circumferential field in such a way that a helical resultant is generated. Owing to the magnetostrictive effect, contraction along helical lines causes twisting of the tubular rod $11e$ so that a torsional mode of the latter can be excited. The longitudinal resonance mode for the rod $11e$ may also be excited by the same energizing components. Thus, the device $10e$ has a sensor $11e$ that is capable of resonating in either torsional or longitudinal motion depending upon the frequency of the excitation of coil $13e$. The ratio of the resonance frequency for the longitudinal mode and the resonance frequency for the torsional mode is 1.6 in the case of a homogeneous steel rod of constant cross-sectional area along its length.

The pickup system of the device $10e$ includes a pickup coil $15e$ extending around the tubular sensor rod $11e$ and an auxiliary polarizing magnet 23. In the case of the longitudinal excitation of the tubular rod $11e$, the longitudinal stressing of the rod induces an alternating voltage in the pickup coil $15e$ at the frequency of the longitudinal vibration of the rod and with a magnitude depending upon the amplitude of the vibration. In the case of torsional excitation of the tubular rod $11e$, the corresponding torsional stressing of the rod changes the permeability of the magnetostrictive material of the latter, as indicated in "Torsional Magnetostrictive Pickups" by S. R. Rich, appearing in Electronics, June 1946, at page 109. The change of permeability causes a flux variation that induces a voltage in pickup coil $15e$.

The sensor rod $11e$ has two nodes N of vibration which are at the same locations for both the torsional and longitudinal resonance. Flanges $19e$ extend from the tubular sensor rod $11e$ at the nodes N and are mounted in rubber or other acoustically soft material, as at 24, within an insulating housing 25 to which the static force F, in the form of a weight or spring force, may be applied for holding the contact tip $12e$ at one end of the tubular rod against the test piece T. As shown, the housing 25 accommodates the coils $13e$ and $15e$ in addition to providing the means by which the static force is applied to the flanges $19e$ by way of the acoustically soft material 24.

With the device $10e$, alternating current is fed to the exciting coil $13e$ either at the resonance frequency for longitudinal motion of the rod $11e$ or at the resonance frequency for torsional motion of the rod under the free condition, and thereafter the contact tip $12e$ is held in steady contact with the test piece and the frequency shift is measured or determined so as to indicate either the normal compliance and hardness of the test piece surface, in the case of longitudinal resonance of the sensor rod, or shear compliance and hardness in the case of torsional resonance of the sensor rod.

Referring now to FIG. 9, it will be seen that the device $10f$ there illustrated has a quarter-wavelength tubular sensor rod $11f$ with a contact tip $12f$ secured at one end and with a body $22f$ of relatively large mass joined to the other end of the sensor rod. The body $22f$ has an axial bore 26 through which a polarizing wire may be extended when effecting permanent magnetization in the circumferential direction of the rod $11f$, as in the disclosure by W. P. Mason identified more fully above.

In the case of torsional vibration, the ratio of the impedance of the body $22f$ to the impedance of the tubular rod $11f$ is proportional to the ratio of the difference between the fourth powers of the outer and inner diameters of the body $22f$ and the difference between the fourth powers of the outer and inner diameters of the tubular rod $11f$. Since the impedance ratio depends on the fourth powers of the diameters, a moderate increase in the diametrical thickness of the body $22f$ over that of the tubular rod $11f$ produces a very substantial impedance increase. Therefore, assuming that the inner diameters of the tubular rod $11f$ and of the body $22f$ are substantially equal, providing the body with an outer diameter that is only moderately larger than the outer diameter of the rod $11f$ will produce a quasi-clamped condition at the connection of the tubular rod $11f$ to the body $22f$, thereby to assure that the device $10f$ will have relatively great sensitivity, that is, relatively large changes or shifts in resonance frequencies in response to loading at its contact tip $12f$.

The pickup $15f$ of the device $10f$ may be a piezo-electric ceramic responding to the torsional stress or motion near the node of vibration of rod $11f$. Such a pickup may be prepared as indicated in the previously mentioned book by W. P. Mason, at page 76, under the heading "Methods for Constructing Torsional Transducers from Ferro-electric Ceramics" and with reference to FIG. 3.11a of that publication.

Although various specific embodiments of this invention have been described herein with reference to the drawings, it is to be understood that the invention is not limited to those precise embodiments, and that various changes and modifications may be effected therein by one skilled in the art without departing from the scope or spirit of the invention, except as defined in the appended claims.

What is claimed is:

1. A resonant sensing device for indicating physical properties of a test piece, comprising mechanical resonating means including at least one contact tip extending therefrom and being held in steady contact with a test piece at a contact surface which progressively increases in cross-sectional area with penetration of said tip into said test piece, electrically energized means tunable to effect vibration of said mechanical resonating means at resonance frequencies thereof and in a mode causing vibrations at said contact tip which are substantially parallel to the contacted surface of the test piece, and indicating means for showing the effect on the vibrations of said mechanical resonating means of said steady contact of the tip with the test piece, which effect is a function of the shear compliance of the contacted surface of the test piece.

2. A resonant sensing device as in claim 1; wherein said mechanical resonating means includes an elongated rod in which longitudinal vibrations are generated by said electrically energized means, and said tip extends laterally from said rod at a loop of the longitudinal motion of the rod to vibrate with the latter in directions parallel to the longitudinal axis of the rod; and wherein said rod is disposed with its longitudinal axis tangential to the surface of the test piece against which said tip is held in steady contact.

3. A resonant sensing device as in claim 2; wherein an additional contact tip projects laterally from said rod in the direction opposed to the first mentioned tip and is held in steady contact with a standard piece so that any difference between the shear compliances at the contacted surfaces of the test piece and standard piece produces bending vibration of said rod; and wherein said indicating means is responsive to the amplitude of said bending vibration produced in said rod which is a function of said difference between the shear compliances.

4. A resonant sensing device as in claim 2; wherein said indicating means is operative to indicate the shift of the resonance frequency of said rod resulting from the steady contact of said contact tip with the test piece.

5. A resonant sensing device as in claim 1; wherein said mechanical resonating means includes an elongated rod having said contact tip at an end thereof and arranged with its longitudinal axis normal to the surface of the test piece against which said tip is held, and said electrically energized means effects vibration of said rod at least in a flexural mode so that the motion of said tip is substantially lateral with respect to said longitudinal axis of the rod.

6. A resonant sensing device as in claim 5; wherein said electrically energized means includes at least one energizing coil on a core extending laterally with respect to said axis of the rod and receiving alternating current at resonance frequencies of said rod for said flexural mode; and wherein said indicating means is operative to indicate the resonance frequency of said rod and hence shows the shift in said resonance frequency arising from said steady contact of the tip with the test piece.

7. A resonant sensing device as in claim 6; wherein said electrically energized means includes a second energizing coil on a core extending laterally with respect to said axis of the rod at right angles to said core of the first mentioned coil and also adapted to receive alternating current at resonance frequencies of said rod for said flexural mode, said first and second coils being alternately energized to provide, at said indicating means, a showing of any difference between the shifts of resonance frequencies for lateral motion of said tip in directions at right angles to each other and, hence, the degree of anisotropy at the contacted surface of the test piece.

8. A resonant sensing device as in claim 6; wherein said electrically energized means further includes an energizing coil wound about said rod and adapted to receive alternating current at resonance frequencies of said rod for the longitudinal mode, said coil wound about the rod and said coil on a core being alternately energized so that the respective shifts of resonance frequencies shown by said indicating means are functions of the normal compliance and of the shear compliance at the contacted surface of the test piece.

9. A resonant sensing device as in claim 5; wherein said mechanical resonating means further includes a body constituting a quasi-infinite mass rigidly connected to said rod at the end of the latter remote from said contact tip, and said rod has a length equal substantially to a quarter of the wavelength of flexural vibrations produced therein at the resonance frequency for the free condition of said tip.

10. A resonant sensing device as in claim 1; wherein said mechanical resonating means includes an elongated rod having said contact tip at an end thereof and arranged with its longitudinal axis normal to the surface of the test piece against which said tip is held, and said electrically energized means effects vibration of said rod at least in the torsional mode to cause oscillation of said tip in a plane tangential to the contacted surface of the test piece.

11. A resonant sensing device as in claim 10; wherein said contact tip is of pyramidal configuration to avoid slipping of the oscillated tip relative to the contacted surface of the test piece.

12. A resonant sensing device as in claim 10; wherein said rod is of square cross-section, and said electrically energized means effecting vibration in the torsional mode includes an energizing coil receiving alternating current at resonance frequencies of the rod in the torsional mode and being wound on a yoke which embraces said rod at diagonally opposed corners of said square cross-section to produce an alternating torque on said rod.

13. A resonant sensing device as in claim 12; wherein said indicating means includes a pickup coil wound on a magnetized yoke embracing the torsionally vibrated rod at diagonally opposed corners of the square cross-section of the latter and which has a voltage induced in said pickup coil under the influence of the variable reluctance effect of the torsionally vibrated rod.

14. A resonant sensing device as in claim 10; wherein said rod is tubular and is magnetized in the circumferential direction, and said electrically energized means includes an exciting coil wound about said tubular rod and receiving an alternating exciting current to cause vibration of the tubular rod in the torsional mode when the exciting current is at a resonance frequency for said torsional mode, and to cause vibration of the tubular rod in the longitudinal mode when the exciting current is at a resonance frequency for said longitudinal mode.

15. A resonant sensing device as in claim 14; wherein said tubular rod has a length substantially equal to a quarter of the wavelength of the torsional vibrations therein at the resonance frequency for the torsional mode in the free condition, a body of substantially greater mass is rigidly secured to the end of said tubular rod remote from said contact tip, said body has a bore extending therethrough in axial alignment with said tubular rod, and the inner diameters of said tubular rod and bore are substantially equal and the outer diameter of said body is substantially greater than the outer diameter of said rod.

16. A resonant sensing device as in claim 1; wherein said electrically energized means is also operative to effect vibration of said mechanical resonating means at resonance frequencies in a mode causing vibrations at said contact tip which are substantially normal to the contacted surface of the test piece.

References Cited by the Examiner

UNITED STATES PATENTS 3,153,338 10/1964 Kleesattel _____ 73—78 X
3,153,850 10/1964 Worlton et al.

RICHARD C. QUEISSER, *Primary Examiner.*

J. J. GILL, *Assistant Examiner.*